United States Patent
Wu et al.

(10) Patent No.: US 12,251,739 B2
(45) Date of Patent: Mar. 18, 2025

(54) PREVENTING SENSOR CONTAMINATION

(71) Applicant: Samsung Electronics Co., Ltd., Suwon-si (KR)

(72) Inventors: Yufeng Wu, Mountain View, CA (US); Nigel Clarke, Mountain View, CA (US); Brian Patton, San Francisco, CA (US); Pedro Martinez Lopez, Mountain View, CA (US); Forrest Gia-Bao Tran, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 17/992,315

(22) Filed: Nov. 22, 2022

(65) Prior Publication Data

US 2024/0131563 A1 Apr. 25, 2024

Related U.S. Application Data

(60) Provisional application No. 63/417,975, filed on Oct. 20, 2022.

(51) Int. Cl.
*B08B 13/00* (2006.01)
*B08B 5/02* (2006.01)
*B08B 17/02* (2006.01)
*G01J 5/00* (2022.01)

(52) U.S. Cl.
CPC ............... *B08B 5/02* (2013.01); *B08B 13/00* (2013.01); *B08B 17/02* (2013.01); *G01J 5/00* (2013.01); *G01J 2005/0077* (2013.01)

(58) Field of Classification Search
None
See application file for complete search history.

(56) References Cited

U.S. PATENT DOCUMENTS 10,808,943 B2  10/2020  Armstrong
11,351,285 B2   6/2022  Brown

FOREIGN PATENT DOCUMENTS

| CN | 113415257 A | 9/2021 |
| CN | 216539788 U | 5/2022 |
| CN | 216649800 U | 5/2022 |
| CN | 114655166 A | 6/2022 |
| JP | 11-277794 A | 10/1999 |
| JP | 11277794 A2 | 10/1999 |

(Continued)

OTHER PUBLICATIONS

Google Patents translation of KR20170126136A (Year: 2024).*

(Continued)

*Primary Examiner* — Eric W Golightly

(57) ABSTRACT

In one embodiment, a system includes a sensor and an airflow generator coupled to an airflow guide configured to direct airflow from the airflow generator toward and past the sensor. The system includes one or more processors and a non-transitory computer readable storage media embodying instructions coupled to the one or more processors, the one or more processors operable to execute the instructions to acquire data about an operational state of the system, wherein the operational state is related to at least one air contaminant generated by the system; and to control the airflow from the airflow generator based on the data about the operational state of the system.

19 Claims, 5 Drawing Sheets

(56) References Cited

FOREIGN PATENT DOCUMENTS

| KR | 10-2015-0035204 A | 4/2015 |
| KR | 10-2017-0126136 A | 11/2017 |
| KR | 20170126136 A | 11/2017 |
| KR | 10-2020-0062202 A | 6/2020 |
| KR | 10-2021-0015177 A | 2/2021 |

OTHER PUBLICATIONS

3M™ 9960FS Anti-Fog Face Shield Film (https://www.3m.com/3M/en_US/p/d/v101150005/), 3 pages, Accessed on Nov. 22, 2022.
International Search Report and Written Opinion in Application No. PCT/KR2023/008144, 11 page, in 12/198/2023 IDS, Sep. 26, 2023.

\* cited by examiner

PREVENTING SENSOR CONTAMINATION

PRIORITY CLAIM

This application claims the benefit under 35 U.S.C. 119 of U.S. Provisional Patent Application No. 63/417,975 filed Oct. 20, 2022.

TECHNICAL FIELD

This application generally relates to preventing sensor contamination.

BACKGROUND

Many electronic devices include one or more sensors to sense some aspect of the device's environment and to enable functionality such as control algorithms or to provide information to users. Contaminants in the environment of the sensor, such as condensation, dirt, aerosols, and heat can cause sensors to operate suboptimally and can prevent sensors from functioning properly or making accurate measurements. Dust, debris, and aerosols are another major source of contamination for sensors. In many cases, these contaminants can be byproducts generated during the operation of a device in which the sensor is embedded. Examples include dust and dirt on a vehicle's backup camera, grease accumulation within cooking appliances, etc.

Condensation typically occurs when moisture in the air encounters a colder surface and forms tiny droplets of liquid water. This commonly referred to as "fogging up", which is problematic for surfaces such as those that require reflectiveness or optical clarity, including mirrors, glasses, or lenses. For a variety of sensors including but not limited to imaging sensors, condensation can have added negative effects such as obscuring the field of view, reducing accuracy, causing sensor malfunction, or even damaging the sensing unit permanently.

Anti-fog coatings typically include a hydrophilic layer that maximizes surface energy and deters droplet formation, but these coatings either compromise clarity of optical surfaces or tend to wear off over time or with mechanical interactions (e.g., manual cleaning). Anti-fog coatings also cannot be applied to certain sensors without affecting their functionality; these may include infrared temperature sensors, particulate sensors, and electrochemical gas (metal oxide or "Taguchi") sensors.

Embedding heating component into surfaces such as glass increases the surface temperature and lowers the probability of condensation, but heating the sensor surfaces to prevent condensation may also negatively impact sensor functionality for many devices.

Some devices have mechanical filters that help prevent debris, dirt, and grease from reaching the sensing units. These filters can inhibit sensor functionality, e.g., by blocking the field of view of a camera. Other devices use physical wipers or liquid sprays to periodically clean up the sensors after contamination. Such active cleaning systems are often bulky, inflexible, and hard to miniaturize, and they cannot typically be used while the sensor is operating.

DESCRIPTION OF EXAMPLE EMBODIMENTS

Figure 1:
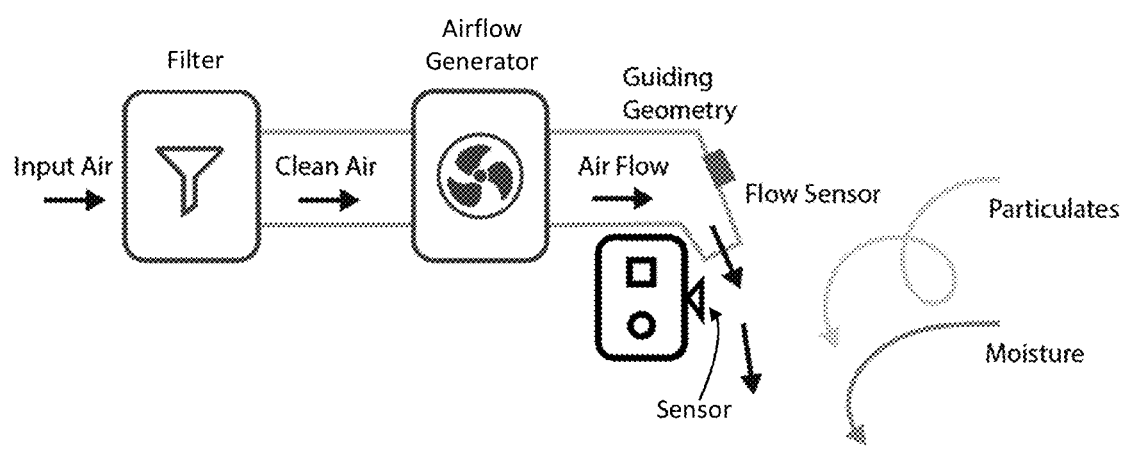
FIG. 1 illustrates an example airflow-generation system that prevents sensor contamination from contaminants created by the system.

FIG. 1 illustrates an example airflow-generation system that prevents sensor contamination from contaminants created by the system. The system of FIG. 1 may be part of a device such as a home appliance (such as a microwave, oven, dishwasher, refrigerator, washer/dryer, etc.), an automobile or other vehicle, or a robot such as a robot vacuum, etc. The example system of FIG. 1 includes an airflow generator that draws air from the environment into the system. In particular embodiments the intake air may be filtered. For example, in particular embodiments the air directed toward and past a sensor should be relatively free of excessive humidity or contaminants that might affect sensor operation. The intake air may be drawn from the ambient environment of the device, e.g., from within a residential space, and may draw air from outside of the system (e.g., from air outside of a cooking appliance). In particular embodiments, air from within the system may be used as intake air, and this intake air may be purified, dehumidified, cooled or heated, or otherwise modified in order to provide suitable air for directing past the sensor to prevent sensor contamination. For example, a natural gas detector in an oven (to detect unburnt gas) may need to be protected from humidity within the oven. Thus, particular embodiments of this example may draw air from within the oven, remove water vapor from that intake air, and then return the dehumidified air past the sensor so that unburnt gas can be detected. As this example illustrates, particular embodiments may remove certain or select contaminants from intake air without disrupting a sensor's ability to detect other contaminants in its environment, for example by taking air from the sensor's environment, partially filtering that air, and then blowing the partially filtered air past the sensor to enable detection while preventing select contaminants from contaminating the sensor or its data. As illustrated in FIG. 1, intake air modification (such as, e.g., air purification) can be arranged such that it is not within the sensor's field of view or does not otherwise affect the sensor's operation.

The example system of FIG. 1 includes a guiding geometry, or airflow guide, that directs airflow out of the system so that the air flows toward and past one or more sensors of the system (e.g. a lens of an RGB camera, a transceiver intake of an ultrasonic sensor, etc.). For example, as illustrated in FIG. 1, the airflow guide directs airflow toward the sensor, but also directs airflow past the sensor so that contaminants such as particulates, moisture, hot air, etc. in the vicinity of the sensor are moved away from the sensor. As contamination such as moisture starts to build up near the sensor, the forced air will push contaminated air away from the sensor and from the sensor's field of view. In addition, the clean airflow provided by the system may also help to clear contamination that has already acquired on the sensor, for example by speeding up evaporation of any minor droplets that have already formed on or near the sensor. In addition, an airflow system may prevent sensor overheating. For example, many sensor packages have built-in systems to pre-compute the recorded data before sending them to an external computing unit. The microcontrollers (MCUs) and other electrical components used in the pre-computing process, in addition to the sensor units themselves, often generate heat, and without a proper way to dissipate the heat, the components are likely to suffer from a decrease in computational power, loss of measurement accuracy, or reduced lifetime. The air flow shown in FIG. 1 may also serve to remove this generated heat and cool the sensor or MCU, particularly if the sensor is installed in a hot enclosed environment and the air is being drawn in from outside or is being cooled as part of a system's air-modification process.

This disclosure contemplates that the sensor may be any suitable sensor, such as an imaging sensor or a non-imaging sensor. While the example of FIG. 1 illustrates a single sensor, a system may have multiple sensors, and one or more of these sensors may be provided with airflow, e.g., as illustrated in FIG. 1. In particular embodiments, each sensor may be provided with airflow from the same airflow guide. In particular embodiments, different sensors may be provided with airflow from different airflow guides, e.g., an airflow guide may be dedicated to providing airflow to a particular sensor. In particular embodiments, more than one airflow system (e.g., air intake, airflow generator, etc.) may be used in a single device to provide airflow to one or more sensors within the device.

An airflow generator may include a fan, a blower, a vacuum pump, etc. As illustrated in the example of FIG. 1, one or more optional airflow sensors can be included within a system, permitting closed-loop control of the air flow rate; alternatively, the flow rate generated by the airflow system may be controlled in open loop. An airflow sensor may be a vortex or mechanical flow sensor. As explained more fully below, air flow can be maintained indefinitely (for example, while the device is in operation or while a sensor is operating), or it can be turned off once the ambient moisture or particulate contamination drops to a level deemed safe for the sensor.

The system of FIG. 1 reduces contamination of a sensor, including contamination caused by operation of the device. In particular embodiments, the operation of the airflow system can be controlled based on the device's operational state, which is associated with the contamination created by the device. Moreover, in particular embodiment, controlling air flow based on a priori knowledge of contamination associated with operational states of the device results in efficient contamination prevention, e.g., without requiring real-time computer vision or machine-learning calculations to be performed on sensor data in order to determine current sensor contamination levels. In addition, controlling airflow generation based on device operation allows the system to proactively prevent sensor contamination rather than simply react to sensor contamination that has already occurred (e.g., condensation that has already collected on the sensor), resulting in improved sensor lifetime and performance. Moreover, the techniques described herein can improve sensor performance by removing contaminants in the field of view of the sensor, even before sensor contamination occurs. For example, if a mug of water is boiling in a microwave equipped with a thermal sensor, then condensation detected by the thermal sensor may result in erroneous temperature readings associated with the water in the mug. Airflow directed in the vicinity of the thermal sensor helps prevent or remove condensation, both from the thermal sensor and from the field of view of the thermal sensor, improving sensor accuracy even when techniques used to detect or remove contamination on the surface of the sensor would not address the environmental contamination.

In particular embodiments, a device can include computer components, such as a processor and memory, for controlling the airflow based on the device's operational state. For example, the device may acquire data about an operational state of the device, which is related to at least one air contaminant generated by the system. The device can then control the airflow from the airflow generator based on the data about the operational state of the system. As an example, in an oven the potential for grease splatter or smoke is a function of the oven's temperature. Thus, the device may acquire data about the oven's current temperature, and the air-flow rate may be very low (or zero) if the oven is below a certain limit, then increase as a function of the oven temperature above that limit. In particular embodiment, state history may also be used. For example, an oven that has been at 400 degrees for 15 minutes may require more airflow than an oven that just reached 400 degrees, as the food item in the latter oven may not have reached a high enough temperature yet to produce smoke or grease. Thus, in this example, airflow may start at some point determined by the device's operational state (e.g., reaching a specified temperature) or state history, and may change based on changes in the operational state or state history. In particular embodiments, a maximum or minimum airflow may be determined based on the capabilities of the airflow system or based on one or more thresholds associated with the device's operational state or state history. Moreover, as explained below, auxiliary information, such as the state of food items within an oven, may also be used to control airflow.

As another example, in a robot vacuum cleaner, sensor occlusion or contamination may depend on the rate of brush rotation. Thus, the air flow rate can scale with the speed of operation of the robot. As another example, in a dishwasher, higher air flow rates would be needed to protect a sensor from water intrusion during the wash and rinse cycles, but a lower air flow rate would be sufficient to prevent condensation during the dry cycle. As another example, a vehicle sensor, such as a backup camera, may suffer contamination, e.g., from the vehicle's exhaust system, and contamination likelihood may increase when the vehicle is not moving (and/or is in an enclosed location) and decrease as the vehicle moves more quickly.

In particular embodiment, the geometry of an airflow guide may be designed to increase airflow in the vicinity of the sensor. For example, the cross-sectional area of the guide may decrease closer to the opening through which air exits to the senso, and the guide may have a smaller cross-sectional area than, e.g., a chamber near the airflow generator, for example as illustrated in FIG. 1.

In particular embodiments, an airflow system can operate concurrently while one or more sensors within the device are making measurements. For example, acoustic sensors may operate while the directed air flow is active, provided that any acoustic noise generated by the airflow generator or by the air flow itself is concentrated outside the frequency bands of interest to the sensor. As another example, airflow can be provided to an IR or RGB camera without disrupting the sensor data, in contrast to other techniques, as described more fully below.

In addition or as an alternative to detecting a device's operational state to control airflow, particular embodiments may use information from one or more auxiliary sensors, which may be located within the device, to control the airflow rate. For example, in a microwave condensation is primarily an issue if the temperature of the food or beverage is above 80° C. A microwave equipped with a thermal-imaging sensor can read the temperature of the food or beverage and activate the airflow when it exceeds this threshold temperature, which is one example of using temperature data of one or more objects within the system to determine how much airflow to generate.

In particular embodiments, this auxiliary sensor may also have airflow directed at it to ensure that sensor contamination does not disrupt the sensor performance. In particular embodiments, the auxiliary sensor may be the same sensor that is being protected from contamination from airflow, or may be a different sensor. As another example of auxiliary sensors, an RGB sensor may be used to capture, images of e.g., the interior of an oven, and the system can then analyze selected frames (e.g., every Nth frame) to determine whether contamination, such as condensation, is in the area of view of the sensor, and this determination may be used (along with the device's operational state, in particular embodiments) to determine whether and how much airflow to provide to the sensor.

This disclosure contemplates that any suitable sensor or sensors may be used to detect contamination, including but not limited to a humidity sensor, a particulate sensor, a temperature sensor, an airflow sensor, a gas sensor, a smoke sensor, a flame sensor, a light sensor/photo-resistor, or an ionization-based particulate sensor. In particular embodiments, one or more thresholds associated with sensor data (e.g., a humidity level) may be used to help determine whether, and how much, airflow to provide to a sensor, which may be the auxiliary sensor or a different sensor, or both.

In particular embodiments, an airflow system requires no additional materials to be included between the sensor and the environment or object it is intended to measure. In existing techniques, sensors such as a camera are often placed behind a protective cover, such as a glass window, to protect the sensor from moisture and contamination. However, having an additional material between the sensor and the object or environment being observed or measured can be problematic. For example, standard glass materials are opaque in the infrared, and therefore these materials cannot be used in front of a thermal camera or infrared temperature sensor. Similar physical barriers can impede acoustic signals that can be detected with a microphone or ultrasonic transducer. Hermetic sealing of the sensor to prevent moisture or particulate intrusion is also incompatible with electrochemical sensors, such as those that detect volatile organic compounds or combustible gases. Flowing air, on the other hand, is largely non-perturbative in many of these applications and permits the sensor to have a more direct line-of-sight to the object or process being observed.

Figure 2:
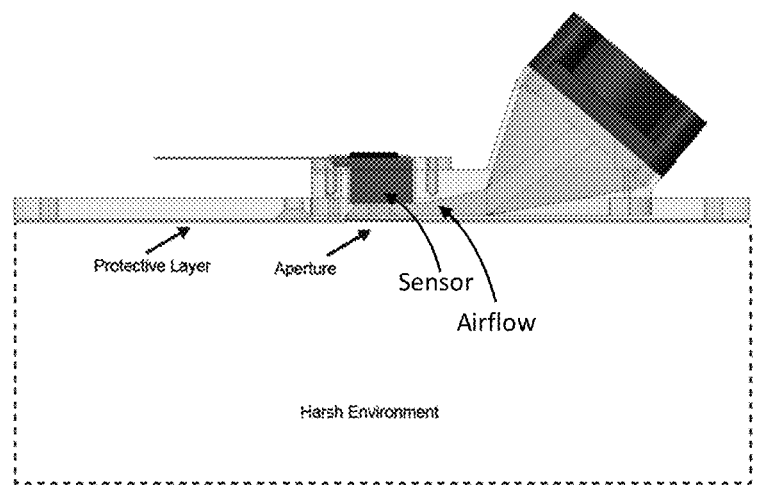
FIG. 2 illustrates an example embodiment in which the sensor is not protected by a cover.

FIG. 2 illustrates an example embodiment in which the sensor is not protected by a cover. As illustrated in FIG. 2, the sensor may nevertheless be located in a relatively harsh environment, such as in the cavity of an oven or a microwave. Many cooking appliances, for example, have relatively harsh environments regarding air contamination, heat, moisture, etc. As illustrated in FIG. 2, the airflow system supplies airflow past the sensor, directing away from the sensor moisture or possible contaminants that travel through the aperture behind which the sensor is located. In particular embodiments, the size of the airflow guide near or at the sensor may be minimized so as to minimize the distance between the sensor and its aperture, to maximize the sensor's field of view.

Figure 3:
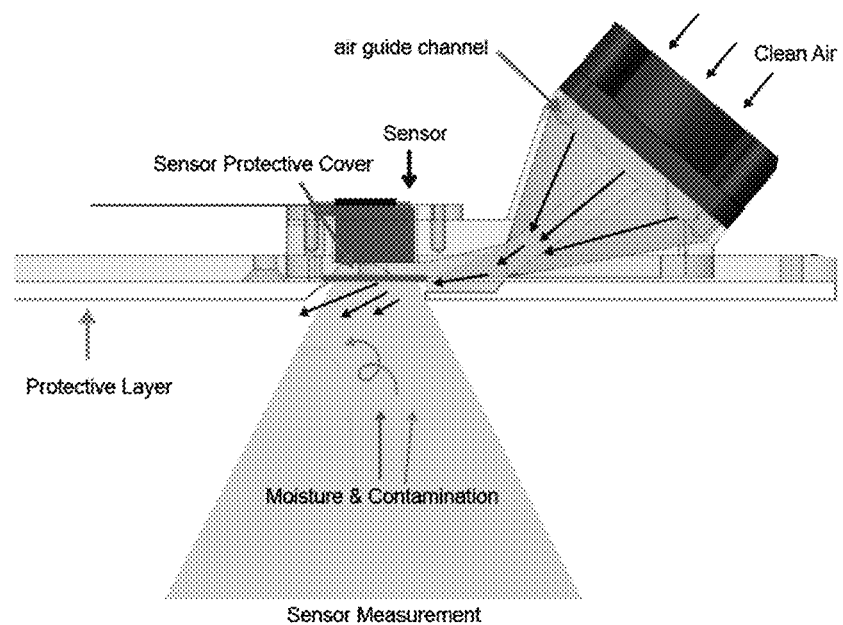
FIG. 3 illustrates an example embodiment in which a sensor is disposed behind a protective covering.

Particular embodiment of this disclosure may include a sensor disposed behind a protective covering. FIG. 3 illustrates an example of one of these embodiments. In the example of FIG. 3, the airflow system directs airflow toward and past the protective covering, for example to prevent contamination from occluding the protective cover and affecting the sensor's measurements. Moreover, in many applications, sensor coverings are not compatible with existing techniques for reducing occlusion from contamination. For example, for infrared temperature sensors and thermal cameras, protective covers are required to be IR-transparent, but many traditional anti-fogging and contamination protection approaches, such as special coatings applied to glass or plastic windows, are not IR-transparent. Thus, particular embodiments of the airflow systems of this disclosure, such as the airflow system of FIG. 3, is able to preemptively reduce and prevent contamination from affecting sensor results, even when other protective techniques may not be used. In particular embodiments, however, the techniques of this disclosure may be utilized in a system or for a sensor that includes additional, other contamination-mitigation techniques, such as specialized coatings.

Figure 4:
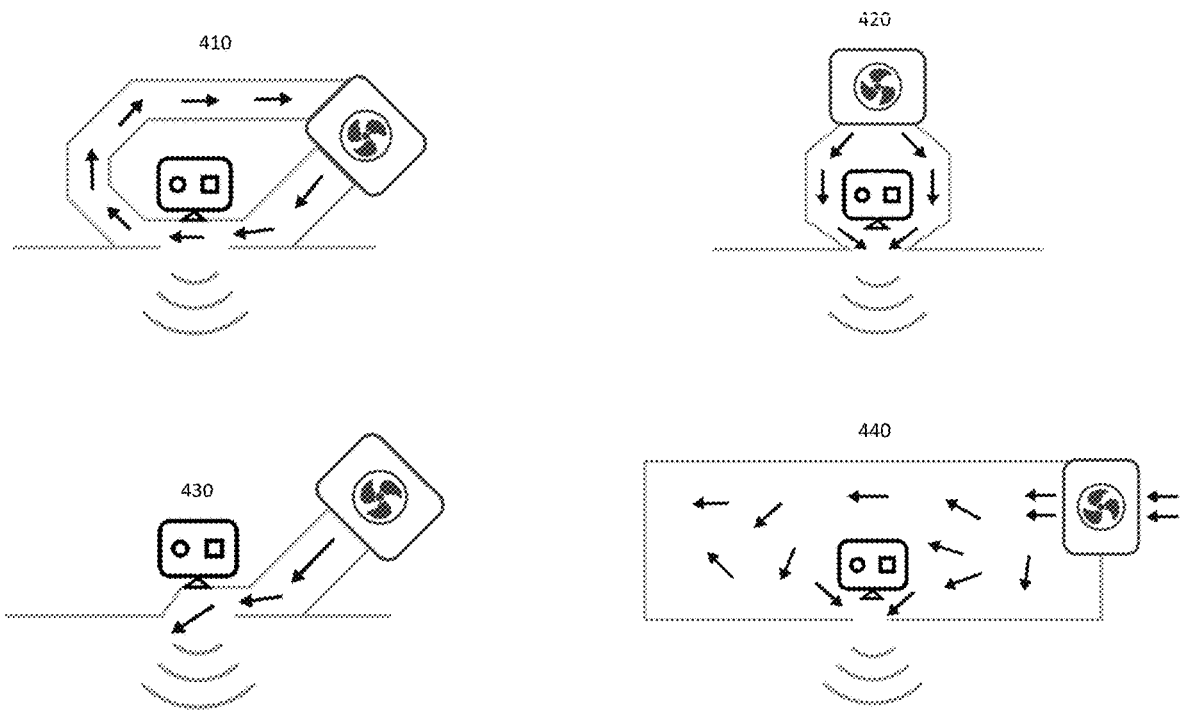
FIG. 4 illustrates example architectures for an airflow system.

While the example of FIG. 1 illustrates a specific architecture for an airflow system, this disclosure contemplates that any suitable architecture may be used. FIG. 4 illustrates additional example architectures for an airflow system. System 410 illustrates a system with a closed-loop circulation geometry. System 420 illustrates a system with a downward-facing airflow geometry, where the airflow guide surrounds the sensor. System 430 illustrates a system that includes a side-firing guide chamber. System 440 illustrates a system in which the sensor is located within the system's positive-pressure chamber.

Figure 5:
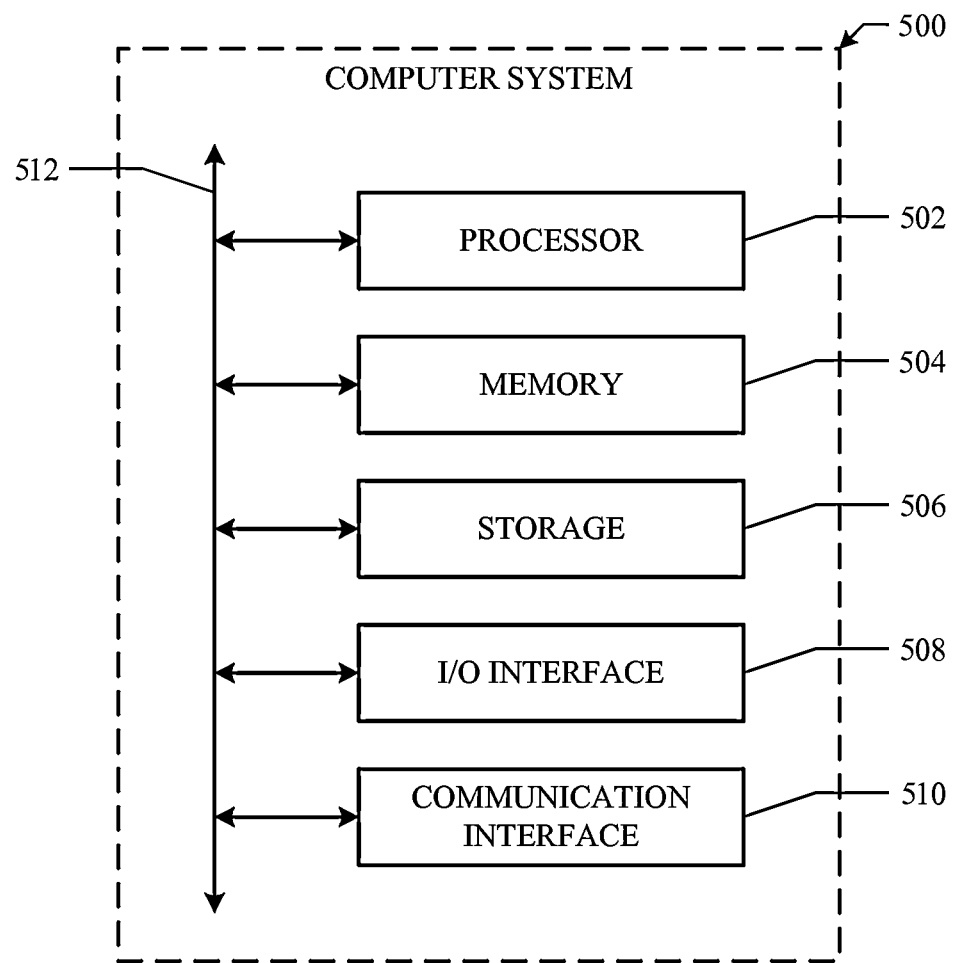
FIG. 5 illustrates an example computing device.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A system comprising:
   a sensor;
   an airflow generator coupled to an airflow guide configured to direct airflow from the airflow generator toward and past the sensor; and
   one or more processors and a non-transitory computer readable storage media embodying instructions coupled to the one or more processors, the one or more processors operable to execute the instructions to:
   acquire data about an operational state of the system, wherein the operational state is a factor in generation of at least one air contaminant that is generated by operating the system; and
   control the airflow from the airflow generator based on the data about the operational state of the system.

2. The system of claim 1, wherein the system comprises a home appliance.

3. The system of claim 2, wherein the home appliance comprises a vacuum cleaner.

4. The system of claim 2, wherein the home appliance comprises a dishwasher.

5. The system of claim 2, wherein the home appliance comprises a microwave or an oven.

6. The system of claim 2, wherein the operational state of the system comprises information about one or more of: an amount of power generated by the home appliance, an amount of power used by the home appliance, or an amount of heat generated by the home appliance.

7. The system of claim 6, wherein the one or more processors are further operable to execute the instructions to increase the airflow from the airflow generator as the power or the heat increases and decrease the airflow from the airflow generator as the power or the heat decreases.

8. The system of claim 1, wherein the one or more processors are further operable to execute the instructions to control the airflow from the airflow generator based on data acquired by one or more auxiliary sensors.

9. The system of claim 8, wherein the data acquired by one or more auxiliary sensors comprises temperature data of one or more objects within the system.

10. The system of claim 1, wherein the system does not include a protective covering between the sensor and the at least one air contaminant.

11. The system of claim 1, wherein the one or more processors are further operable to execute the instructions to control the airflow from the airflow generator based on data acquired by the sensor.

12. The system of claim 1, wherein the airflow guide comprises one or more of:

an outlet and a chamber between the outlet and the airflow generator, wherein an area of the outlet through which the airflow flows is less than an area of the chamber; or a first chamber having an outlet and a second chamber having an inlet, wherein the first chamber guides airflow from the airflow generator to the sensor and the second chamber guides airflow directed toward the sensor back to the airflow generator.

13. The system of claim 2, wherein air in the airflow directed by the airflow generator is drawn from outside the home appliance.

14. The system of claim 2, wherein air in the airflow directed by the airflow generator is drawn from within the home appliance.

15. The system of claim 1, wherein air in the airflow directed by the airflow generator is treated to remove one or more air contaminants before it is directed past the sensor.

16. A method comprising:
acquiring data about an operational state of a system comprising:
a sensor; and one or more processors and a non-transitory computer readable storage media embodying instructions coupled to the one or more processors, the one or more processors operable to execute the instructions to: acquire data about an operational state of the system, wherein the operational state is a factor in generation of at least one air contaminant that is generated by operating the system; and control the airflow from the airflow generator based on the data about the operational state of the system
an airflow generator coupled to an airflow guide configured to direct airflow from the airflow generator toward and past the sensor;
and
controlling the airflow from the airflow generator based on the data about the operational state of the system.

17. The method of claim 16, wherein the system comprises a home appliance.

18. The method of claim 17, wherein the operational state of the system comprises one or more of: an amount of power generated by the home appliance or an amount of heat generated by the home appliance.

19. The method of claim 16, further comprising controlling the airflow from the airflow generator based on data acquired by one or more auxiliary sensors.

* * * * *